July 24, 1962

R. S. PATCH ETAL 3,045,441

PROCESS AND APPARATUS FOR MAKING AND DISPENSING
PARTIALLY CONGEALED PRODUCTS

Filed Nov. 14, 1960

INVENTORS
ROBERT S. PATCH
HARVEY F. SWENSON
BY
Barnes & Seed
ATTORNEYS

July 24, 1962 R. S. PATCH ETAL 3,045,441
PROCESS AND APPARATUS FOR MAKING AND DISPENSING
PARTIALLY CONGEALED PRODUCTS
Filed Nov. 14, 1960 3 Sheets-Sheet 2

INVENTORS
ROBERT S. PATCH
HARVEY F. SWENSON
BY
*Barnes & Seed*
ATTORNEYS

July 24, 1962 R. S. PATCH ETAL 3,045,441
PROCESS AND APPARATUS FOR MAKING AND DISPENSING
PARTIALLY CONGEALED PRODUCTS
Filed Nov. 14, 1960 3 Sheets-Sheet 3
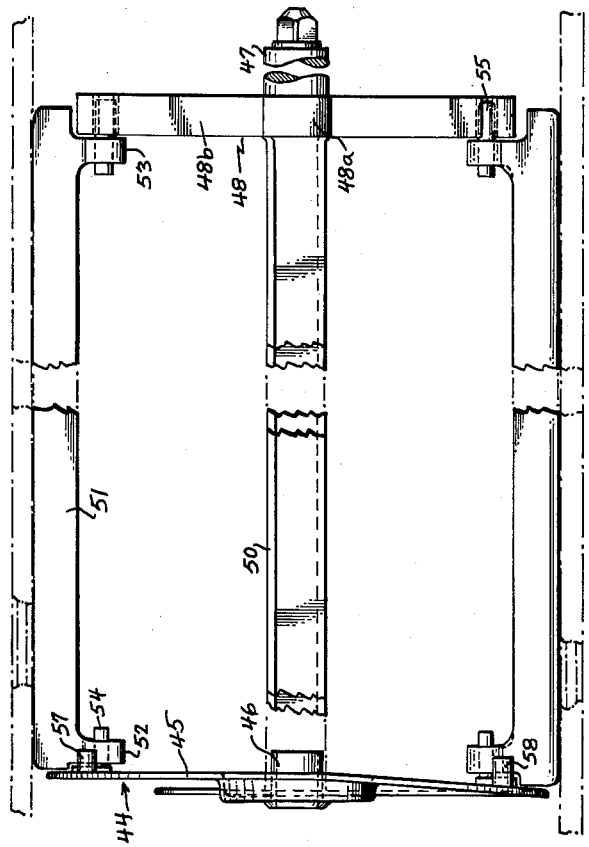
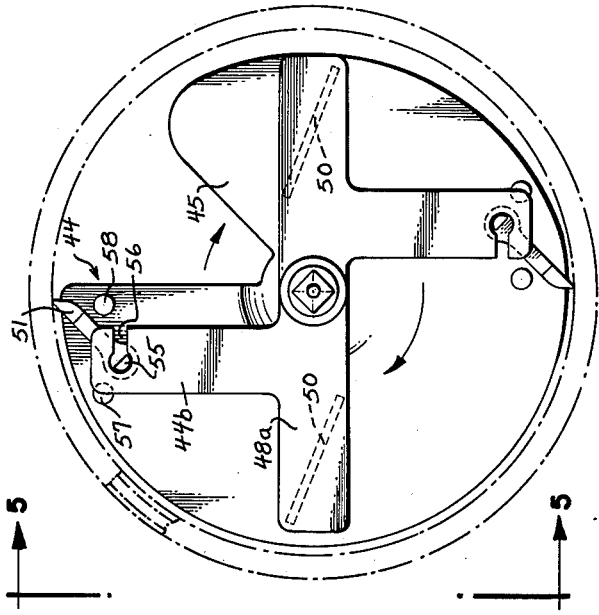
INVENTORS
ROBERT S. PATCH
HARVEY F. SWENSON
BY
ATTORNEYS

United States Patent Office 3,045,441
Patented July 24, 1962

3,045,441
PROCESS AND APPARATUS FOR MAKING AND DISPENSING PARTIALLY CONGEALED PRODUCTS
Robert S. Patch, Bainbridge Island, and Harvey F. Swenson, Seattle, Wash., assignors to Sweden Freezer Manufacturing Co., Seattle, Wash., a corporation of Washington
Filed Nov. 14, 1960, Ser. No. 68,936
21 Claims. (Cl. 62—68)

The present invention relates to process and apparatus for making and dispensing partially congealed products, and more particularly for producing and dispensing a frozen product in the form of slush ice to which flavoring is added and mixed as it discharges thereby making a frozen treat or dessert.

The invention aims to provide such a process and apparatus which will give a uniform homogeneous product even under heavy output requirements.

A further object is to provide a dispensing freezer as for slush ice which is so engineered as to enable all working parts touched by the product to be easily removed from the machine and cleaned without the use of tools.

Still another object is to provide such apparatus which will attractively display the congealed product before dispensing.

The invention has yet the further object of devising an improved dasher assembly for congealing cylinders which is not only easy to clean, but will efficiently scrape the cylinder walls, adequately circulate the congealed product, and urge such product toward the discharge gate.

This and other more particular objects and advantages will appear and be understood in the course of the following description and claims, the invention consisting in the novel construction and in the adaptation and combination of parts hereinafter described and claimed.

In the accompanying drawings:

FIG. 4 is a rear elevational view of the improved dasher assembly; and

FIG. 5 is a side elevational view of the dasher assembly taken as indicated by the line 5—5 in FIG. 4.

Figure 1:
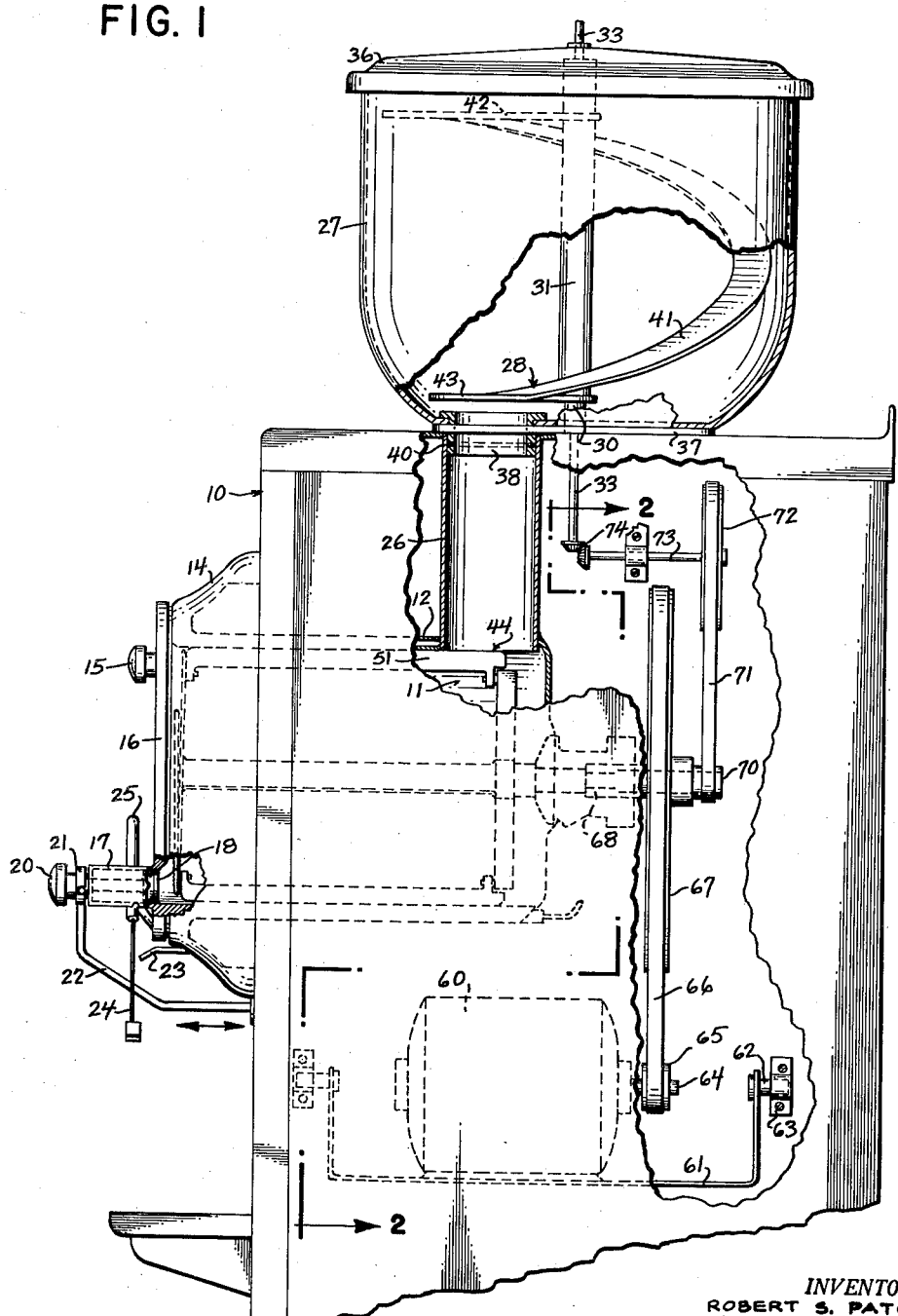
FIG. 1 is a fragmentary side elevational view with parts broken away and in vertical section, of a dispensing freezer embodying the present invention.

Referring to the drawings, numeral 10 designates the cabinet of a dispensing freezer having a freezing cylinder 11 surrounded by a jacket 12 for a suitable refrigerant. The refrigerant is cycled through a standard refrigeration system including a compressor driven by an electric motor whose control circuit includes a micro-switch 13 which, as will later be explained, is opened to shut off the compressor responsive to a desired viscosity of frozen product in the freezing cylinder. A boss 14 of a thermal insulating material projects forwardly from the cabinet and receives thumb screws 15 for holding a cover plate 16 for the freezing cylinder in position.

Provided by the cover plate is a spigot 17 which has an axial discharge bore intersected by a bottom delivery port controlled by a gate comprising a slide valve 18. The stem for the latter projects through the front of the spigot and threadably receives a knob 20 which together with a keeper 21 retains a hook formed at the end of a slide rod 22. A suitable linkage operated by a treadle assembly (not shown) actuates the slide rod 22 to operate the slide valve 18. This treadle assembly also operates a flavoring supply system (not shown) to spouts 23 and controls the driving of a beater 24 driven by a flexible drive through a swingable guide tube 25.

Figure 3:
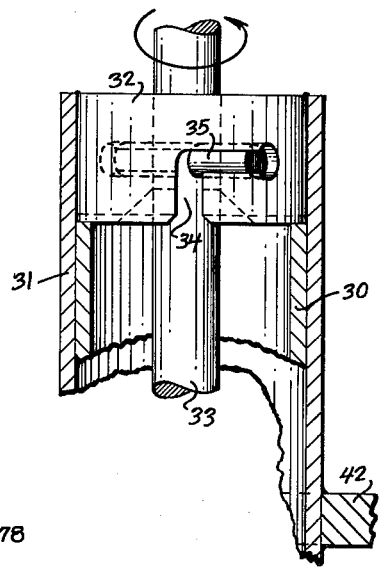
FIG. 3 is a detail vertical sectional view illustrating the drive coupling at the top of the auger shaft in the upper bowl.

The freezing cylinder communicates at the top by an upright interchange tube 26 with a supply bowl 27 mounted on the top of the cabinet 10 and having an auger 28 working therein. For display reasons this bowl and the auger are preferably formed of transparent plastic such as a suitable acrylic. Upstanding from a water-tight weld connection with the base of the bowl and formed of the same material, is a rigid bearing tube 30 open at both ends and forming the journal for the hollow shaft 31 of the auger 28. As shown in FIG. 3, the auger shaft 31 projects above the tube 30 and is fitted with a coupling 32 which seats on the upper end thereof to make a driving connection from a drive shaft 33 which projects upwardly from within the cabinet 10. The coupling 32 has a pair of diametrically opposite bayonet slots 34 receiving the ends of a drive pin 35 extending through the drive shaft 33. The latter may project up through the lid 36 of the tank and be slotted to receive an advertising placard. A mounting plate 37 reinforces the base of the tank and together therewith is provided with a depending flanged neck 38 equipped with an O-ring 40 for interfitting with the interchange tube 26.

It will be noted that the upper part of the bowl 27 is cylindrical and that about half way down the bowl gradually tapers to a diameter reduction of approximately 30%. The blade 41 of the auger 28 has a slight clearance with the bowl and its spiral tapers in accordance with that of the bowl as the blade partakes of a turn between flat support arms 42—43 which radiate top and bottom from the shaft 31. Of significance is the fact that the blade 41 is relatively narrow to leave adequate space between it and the shaft 31 for product circulation.

A dashed assembly 44 is journal mounted in the freezing cylinder and includes a circular auger plate 45 which has about a 45° cutout and is spiral formed so that the portions adjoining the cutout are offset from one another longitudinally of the dasher. With this arrangement frozen product in the freezing cylinder will be urged toward the cover plate and its spigot 17 for selected discharge therefrom responsive to turning of the dasher.

At its center the auger plate 45 has a hub 46 for journaling on a pin which projects rearwardly from the center of the cover plate 16. This hub 46 is complemented at the rear by a stub shaft 47 which projects from a flat back member 48 through the rear wall of the freezing cylinder and is sealed such, for example, as shown in United States Patent No. 2,604,307. The back member 48 comprises a pair of diametrically opposite arms 48a from which extend integral oppositely extending legs 48b. A rigid connection is made between the arms 48a and the auger plate 45 by a pair of parallel flat paddles 50. These purposely have a relief angle of about 15° between their planes and the common diameter of the arms 48a so that as they rotate to circulate the frozen product, some of the product engaged thereby will be urged toward the center of the related freezing cylinder 11.

Self-adjusting scraper blades 51 are also provided and these are made removable for cleaning ease. Each scraper blade has front and rear bosses 52—53 which project oppositely from the scraping edge and are through-bored parallel to the latter. The front boss 52 serves as a journal for a trunnion 54 which projects rearwardly from the auger plate 45 while the rear boss 53 has a gudgeon 55 fixed therein and projecting rearwardly with reduced cross-section of semi-circular shape having its flat facing generally toward the scraping edge of the blade. As seen in FIG. 4, the gudgeons 55 are received in keyhole slots 56 extending from the opposed edges of the legs 48b. Swing of each scraper blade is limited by stop pins 57—58 projecting rearwardly from the auger plate 45 at opposite sides of the respective trunnion 54.

The fit of each front boss 52 in its trunnion 54 is of sufficient tolerance to permit its scraping blade to be installed by first positioning the blade with its gudgeon 55 alongside the mouth of the respective keyhole slot 56 and the front boss registering with the trunnion. Then, when the blade is directed such that the flat face of its gudgeon is parallel to the entry side edges of the keyhole slot, the O rear end of the blade can be swung to bring the gudgeon into the eye of the slot. Subsequent rotation of the blade toward the related stop pin 58 locks the gudgeon in the keyhole eye. The stop pins 57 are provided to prevent the dasher assembly from being installed in the freezing cylinder. It can be seen that with such a dasher assembly frozen product will be scraped from the cylinder wall by the blades 51 and circulated by the paddles 50.

The dasher assembly and the auger 28 are driven at different speeds from an electric motor 60 which is mounted on a cradle 61. This cradle is swung on trunnions 62 mounted in fixed bearings 63 which are purposely alined with the drive shaft 64 of the motor. Power is transferred from the motor via a sheave 65, belt 66, and sheave 67 to an intermediate shaft 68. Such has a front socket interfitting with the dasher stub shaft 47 rearwardly of the freezing cylinder and is given journal support fore and aft of the sheave 67. Further speed reduction for the auger 28 from the shaft 68 is given by a sheave 70, belt 71, and sheave 72 mounted on a secondary shaft 73. This in turn drives by bevel gears 74 the upright shaft 33 which, as afore described, is coupled at the top to the hollow auger shaft 31. It has been found that dasher and auger speeds of about 218 r.p.m., and 40 r.p.m., respectively, give excellent results.

Figure 2:
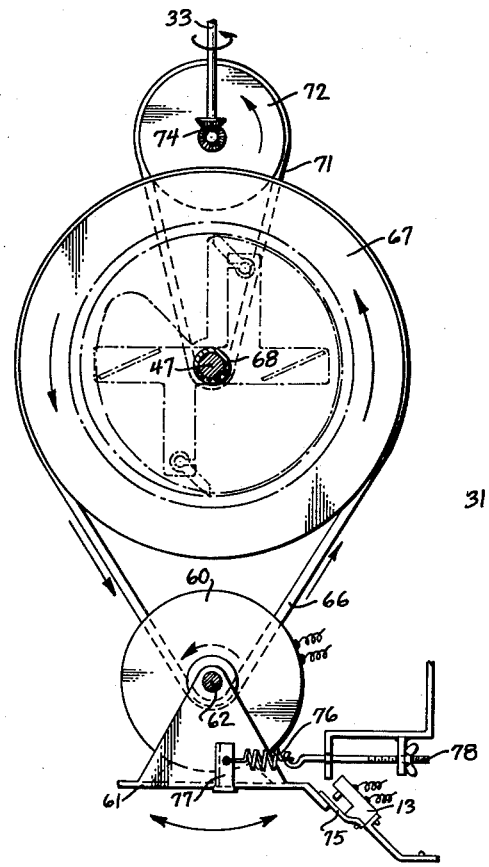
FIG. 2 is a fragmentary vertical sectional view taken as indicated by the line 2—2 of FIG. 1.

As before mentioned, the control circuit for the refrigeration compressor motor includes a micro-switch 13, and this switch is a normally open differential type arranged to be closed responsive to pressure on a leaf 75. A spring 76 (FIG. 2) connected between a cradle lug 77 and a tension adjusting screw 78 yieldingly urges the cradle 61 into engagement with the leaf 75 to hold the switch closed during an initial swing range of the cradle instituted responsive to torque load on the motor 60. This load varies in accordance with the viscosity of the product in the freezing cylinder because of the dasher turning resistance induced by the paddles 50. Thus, as the product freezes the reactive force buildup in the cradle 61 causes it to swing away from the switch 13 in opposition to the spring 76. Accordingly, a proper preloading of the latter obtained by adjusting the screw 78 permits the switch 13 to self-open and shut off the compressor when the frozen product has reached a predetermined consistency and likewise, when the frozen product warms too much due to external conditions or the addition of unfrozen product into the bowl 27, thereby reducing its viscosity to a predetermined amount, the resulting decrease in motor torque permits the spring 76 to force the cradle 61 against the switch leaf 75 and open the switch 13 for starting the compressor.

When slush ice is to be prepared by the freezer, the freezing cylinder 11 and bowl 27 are filled with water through the top of the latter, and the motor 60 and the compressor motor turned on by switches conveniently located on the cabinet 10. As the water begins to freeze on or adjacent the refrigerated walls of the cylinder it is scraped free as ice particles and circulated by the dasher assembly 44. Since these ice particles have a lower specific gravity than the water they tend to float and many gradually rise through the interchange tube 26 into the overhead bowl 27. This action is not prevented by the auger 28, but the action of the latter not only circulates the material in the bowl but does tend to urge a portion of the ice particles downwardly into the interchange tube 26 in counterflow to those floating upwardly therein.

The ice particles in the bowl precool the water therein for more efficient operation, and since the bowl is transparent, they result in an attractive and inviting product display. When the freezing cylinder becomes substantially filled with ice particles the load on the motor 60 builds up to the point that the switch 13 opens as afore described to cut off the compressor motor. However, the dasher assembly and auger are kept in constant operation to maintain uniform product consistency and circulation through the interchange tube 26. As the level in the bowl lowers responsive to dispensing of the slush ice, the bowl is replenished with water from time to time. The frozen product is usually dispensed into a paper cup and during the dispensing operation a change of a selected flavoring is also dispensed into the cup from one of the spouts 23 and is mixed with the slush ice by the action of the beater 24.

It is also appreciated that the water may be colored and/or flavored before being supplied in liquid form to the bowl.

Although the present invention has been illustrated in conjunction with a dispensing freezer, it is to be expressly understood that in lieu of a gate controlled exit from the freezing cylinder, frozen product can be hand dipped from the top of the bowl 27 with the cover 36 removed.

It is thought that the invention will have been clearly understood from the foregoing detailed description. Changes in the details of process steps and apparatus construction will suggest themselves without departing from the spirit of the invention, wherefore it is our intention that no limitations be implied and that the hereto annexed claims be given a scope fully commensurate with the broadest interpretation to which the employed language admits.

What we claim is:

1. In a dispensing freezer, a freezing chamber having a gate-controlled outlet for discharging frozen product, a non-freezing liquid supply chamber above said freezing chamber and continuously communicating therewith through an interchange tube smaller in cross-section than said chambers, frozen product in said freezing cylinder being free to float upwardly into said supply chamber, and rotary means in said chambers for circulating frozen product back and forth between said chambers and toward said outlet.

2. In a dispensing freezer, a freezing cylinder having a gate-controlled outlet for discharging frozen product, a driven dasher operating in said cylinder, said dasher being adapted to circulate frozen product and to deliver frozen product at said outlet, a chamber for liquid product at a higher level than said cylinder and communicating therewith through an interchange tube of reduced cross-section relative to said chamber, frozen product in said cylinder being free to float upwardly into said chamber, and auger means operating in said chamber for urging frozen product downwardly toward said cylinder.

3. In a dispensing freezer, a horizontal freezing cylinder having a gate-controlled outlet at one end and an inlet at the top of reduced cross-section relative to said cylinder, a rotary dasher in said cylinder and driven from the other end thereof, a downwardly tapered liquid supply container above said inlet and communicating therewith, and tapered auger means operating in said chamber and conforming to the taper thereof for urging toward said cylinder, frozen product that has floated up from the cylinder into the container.

4. In a dispensing freezer, a horizontal freezing cylinder having a gate-controlled outlet at one end and an inlet at the top spaced rearwardly from said outlet, and smaller in cross-section than said cylinder, a driven rotary dasher in said cylinder having auger means adjacent said outlet for urging frozen product thereto, said dasher also having scraping means for acting on the wall of the cylinder and paddle means for circulating frozen product, a downwardly tapered liquid supply container located above said inlet and communicating therewith, frozen product being free to float upwardly from said cylinder into said container, and tapered auger means operating in said container and conforming to the taper thereof for urging frozen product downwardly toward said cylinder.

5. In a dispensing freezer, a horizontal freezing cylinder having a gate-controlled outlet at one end, rotary combination dasher and dispensing auger means in said cylinder and having a drive shaft extending through the other end thereof, an upright liquid supply container having a vertical center axis offset from said cylinder at said other end thereof, and having a bottom outlet offset from said axis and vertically communicating with the top of said cylinder, frozen product being free to float upwardly from said cylinder into said container, downwardly working auger means in said container journal-mounted on said axis and having a drive shaft depending through the bottom of the container, and means for driving said drive shafts.

6. The structure of claim 5 in which said means for driving said drive shafts comprises a motor, means for transferring power from said motor to said drive shaft for the combination dasher and dispensing auger means, and means for transferring power at reduced speed from the latter said drive shaft to said depending shaft from the auger means in the container.

7. In a dispensing freezer, a freezing chamber having a gate-controlled outlet for discharging frozen product, a liquid supply chamber communicating with said freezing chamber, rotary means in said chambers for circulating frozen product back and forth therebetween and toward said outlet, said rotary means including a product circulating blade in said freezing chamber adapted to sense stiffness of frozen product, a motor having a driving connection with said rotary means and pivotally mounted to swing responsive to torque load thereon, means yieldingly resisting said swing, a refrigeration system for said freezing chamber and having an electric control circuit including a switch arranged to be closed when said motor has swung a predetermined amount.

8. In a dispensing freezer, a freezing chamber having an inlet and a gate-controlled outlet for discharging frozen product, liquid supply means communicating with said inlet, and a dasher assembly journaled on an axis in said freezing chamber and having scraping means for scraping frozen product from the wall of the freezing chamber, paddle means for circulating the frozen product, and auger means for urging frozen product toward said outlet, said scraping means, paddle means and auger means being separate parts of said dasher assembly.

9. In a dispensing freezer, a horizontal freezing cylinder having a gate-controlled outlet in one end and an inlet at the top, a rotary dasher assembly in said cylinder and driven from the other end thereof, a downwardly tapered liquid supply container above said inlet and communicating therewith, and tapered auger means operating in said chamber and conforming to the taper thereof, said dasher assembly having scraping means for scraping frozen product from the wall of the freezing chamber, paddle means for circulating the frozen product, and auger means adjacent said outlet and operative in a minor part of the length of said freezing chamber for urging frozen product toward said outlet.

10. In a dispensing freezer, a horizontal freezing cylinder having a gate-controlled outlet at one end and an inlet at the top, a rotary dasher in said cylinder and having a dasher drive shaft extending through the other end thereof, a bowl above said cylinder and having a vertical center axis and an outlet offset from said axis, an interchange tube interconnecting said outlet of the bowl and said inlet of the freezing cylinder, an upstanding elongated bearing tube on said axis and seal-connected at the bottom to the base of said bowl, said bearing tube being open at both ends, an auger in said bowl journaled on said bearing tube and extending thereabove, an auger drive shaft coupled to said auger at the top of said bearing tube and depending through the latter and beneath the bowl to a position alongside said interchange tube, and drive means for turning said drive shafts.

11. The structure of claim 10 in which said drive means comprises a motor, a first speed reduction from said motor to said dasher drive shaft, and further speed reduction from said dasher drive shaft to said auger drive shaft.

12. The structure of claim 10 in which said drive means comprises a secondary shaft parallel to said dasher drive shaft and having a driving connection at one end with the lower end of said auger drive shaft by a set of bevel gears, a speed reduction drive from said dasher drive shaft to the other end of said secondary shaft, a motor, and a speed reduction drive from said motor to said dasher drive shaft.

13. The structure of claim 10 in which said auger drive shaft projects above said bowl for receiving an advertising device.

14. In a dispensing freezer, a freezing chamber with a gate-controlled outlet, a bowl above said chamber and having a vertical center axis, an interchange tube offset from said axis and interconnecting said bowl and chamber, an upstanding elongated bearing tube on said axis and seal-connected at the bottom to the base of said bowl, said bearing tube being open at both ends, a circulating device in said bowl journaled on said bearing tube and extending thereabove, a drive shaft coupled to said device above said bearing tube and depending through the latter to a point beneath said bowl, and drive means operatively associated with the lower end of said drive shaft.

15. In a dispensing freezer, a freezing chamber with a gate-controlled outlet, a bowl above said chamber and having a vertical center axis, said bowl being tapered toward its base, an interchange tube offset from said axis and interconnecting said bowl and chamber, and an auger journal-mounted in said bowl for rotation about said axis, said auger comprising center rotary means, a relatively narrow auger blade partaking of approximately one turn and following the taper of the bowl, and upper and lower arms radiating from said rotary means and connected to said blade.

16. In a dispensing freezer, a freezing chamber having an inlet and a gate-controlled outlet for discharging frozen product, liquid supply means communicating with said inlet, and a dasher assembly journaled on an axis in said freezing chamber and having an auger member adjacent said outlet, a support member in parallel spaced relation to said auger member, scraping blades pivotally mounted between said members for scraping the wall of said freezing chamber, and flat paddle blades rigidly connected between said members and each tilted relative to said axis in the direction of dasher rotation.

17. For a dispensing freezer, a front auger plate, a back plate alined therewith on a longitudinal center axis, scraping blades equally spaced from said axis and pivotally mounted at their ends on said plates to act in a given direction of rotation about said axis, stop means limiting swing of said scraping blades, and flat paddles rigidly mounted between said plates and equally spaced from said axis closer thereto than said scraping blades, said paddles being tilted in said direction of rotation at an acute angle relative to respective radii thereto from said axis.

18. In a freezer, a freezing chamber, a liquid supply chamber communicating with said freezing chamber, means in said chambers for circulating frozen product back and forth therebetween and including product circulating means in said freezing chamber adapted to sense stiffness of frozen product, power means having a driving connection with said product circulating means and mounted to move responsive to torque load thereon such that the displacement of said power means is a measure of the frozen product load on the product circulating means, means yieldingly resisting said displacement of the power means, and a refrigeration system for said freezing chamber and having control means arranged to deactivate said system when said power means has been displaced a predetermined amount.

19. A process for making a partially congealed homogeneous product from a given volume of liquid comprising, placing part of said liquid in a congealing zone and the remainder in a non-congealing zone which is elevated relative to said congealing zone and is in constant restricted communication therewith, continuously freeing particles of congealed product in said congealing zone and floating such particles into said non-congealing zone, continuously agitating the material in both said zones, and dispensing product from said congealing zone at a point remote from the point of said communication with said non-congealing zone.

20. A process for making a partially congealed homogeneous product from a given volume of liquid comprising placing part of said liquid in contact with a congealing surface, in a dispensing zone, and the remainder in a non-congealing zone which is elevated relative to said congealing surface and is in constant communication therewith through a relatively narrow interchange, continuously moving said congealing surface and liquid relative to one another, continuously scraping particles of congealed product from said congealing surface and floating such particles up toward said non-congealing zone, continuously agitating the material in said non-congealing zone downwardly toward said congealing surface; and withdrawing product from said dispensing zone remote to said interchange.

21. A process for making slush ice comprising, delivering by gravity flow liquid from an elevated non-freezing zone to a freezing zone having a freezing surface, scraping frozen product from said surface, permitting said frozen product in said liquid to float upwardly into said non-freezing zone through a restricted opening whereby said freezing zone is filled with slush ice prior to said non-freezing zone being filled therewith, and dispensing slush ice from said freezing zone.

References Cited in the file of this patent
UNITED STATES PATENTS

| | | |
|---|---|---|
| 824,075 | Gerner | June 19, 1906 |
| 1,957,707 | Flauser | May 8, 1934 |
| 2,059,065 | Tuscan | Oct. 27, 1936 |
| 2,100,742 | Hartman | Nov. 30, 1937 |
| 2,150,792 | Willat | Mar. 14, 1939 |
| 2,526,367 | Kaltenbach | Oct. 17, 1950 |
| 2,608,833 | Woodruff | Sept. 2, 1952 |
| 2,622,411 | Ogden | Dec. 23, 1952 |
| 2,656,689 | Muffly | Oct. 27, 1953 |
| 2,735,276 | Thompson | Feb. 21, 1956 |
| 2,836,401 | Phelan | May 27, 1958 |
| 2,924,952 | Swenson | Feb. 16, 1960 |

FOREIGN PATENTS

| | | |
|---|---|---|
| 185,552 | Great Britain | Mar. 27, 1922 |
| 603,061 | Germany | Sept. 21, 1934 |